United States Patent
Sato

(10) Patent No.: US 12,151,329 B2
(45) Date of Patent: Nov. 26, 2024

(54) MACHINE TOOL

(71) Applicant: HARU TECHNIQUE LABORATORY INC., Okayama (JP)

(72) Inventor: Tadayoshi Sato, Okayama (JP)

(73) Assignee: HARU TECHNIQUE LABORATORY INC., Okayama (JP)

( * ) Notice: Subject to any disclaimer, the term of this patent is extended or adjusted under 35 U.S.C. 154(b) by 0 days.

(21) Appl. No.: 17/905,349

(22) PCT Filed: Sep. 25, 2020

(86) PCT No.: PCT/JP2020/036214
§ 371 (c)(1),
(2) Date: Aug. 31, 2022

(87) PCT Pub. No.: WO2022/064629
PCT Pub. Date: Mar. 31, 2022

(65) Prior Publication Data
US 2023/0330794 A1 Oct. 19, 2023

(51) Int. Cl.
| | | |
|---|---|---|
| *B23Q 1/64* | (2006.01) | |
| *B23Q 1/70* | (2006.01) | |
| *B23Q 5/20* | (2006.01) | |
| *B23Q 1/48* | (2006.01) | |

(52) U.S. Cl.
CPC ............ *B23Q 1/70* (2013.01); *B23Q 1/64* (2013.01); *B23Q 5/20* (2013.01); *B23Q 1/48* (2013.01)

(58) Field of Classification Search
None
See application file for complete search history.

(56) References Cited

U.S. PATENT DOCUMENTS

| | | |
|---|---|---|
| 4,014,439 A | 3/1977 | Kochsiek et al. |
| 5,197,836 A | 3/1993 | Crivellin |
| 5,482,415 A | 1/1996 | Belaga et al. |

FOREIGN PATENT DOCUMENTS

| | | | |
|---|---|---|---|
| DE | 2224202 A1 | | 11/1973 |
| DE | 4294840 T1 | | 9/1994 |
| EP | 0486992 A1 | | 5/1992 |
| JP | S63-52937 A | | 3/1988 |
| JP | H03-190646 A | | 8/1991 |
| JP | H06335805 A | * | 12/1994 |
| JP | 2012-096313 A | | 5/2012 |

OTHER PUBLICATIONS

International Search Report dated Dec. 1, 2020 issued in Patent Application No. PCT/JP2020/036214.

* cited by examiner

*Primary Examiner* — Tanzim Imam
(74) *Attorney, Agent, or Firm* — Pearne & Gordon LLP

(57) ABSTRACT

Provided is a machine tool including: a movable drum base (4); a drum (5) that is incorporated in the drum base (4) and is circular in outline; and a quill main spindle (6) penetrating through the drum (5) in a central axis direction of the drum (5), wherein protrusion allowance from the drum (5) is adjustable, wherein a bearing provided along an outer circumference of the drum (5) is interposed between the drum base (4) and the drum (5) such that the drum (5) is rotatable in the drum base (4), and movement of the drum base (4), rotation of the drum (5), and protrusion allowance adjustment of the quill main spindle (6) from the drum (5) allow a tool (10) mounted on the quill main spindle (6) to be positioned.

2 Claims, 10 Drawing Sheets

MACHINE TOOL

TECHNICAL FIELD

The present disclosure relates to a machine tool for processing a workpiece by rotating a tool.

BACKGROUND

A vertical machining center and a horizontal machining center are known as types of a machining center, which is a machine tool. Among them, in the horizontal machining center, a rotating shaft for a tool (cutting tool) is oriented horizontally (in parallel to an installation surface) and the position of the tool is controllable in 3 axial directions. For example, by controlling a table to move in an X-axis direction (right-left direction), the tool moves accordingly along with the table so that the tool can be moved to an intended position in the X-axis direction.

Such mechanisms as LM guide (Linear Motion Guide) are used as a mechanism for moving the table. In this case, however, a footprint in the X-axis direction increases because there are a motor and a rail extending in the X-axis direction in which the table moves. Accordingly, a space-saving automated machine tool described in Patent Literature 1 rotates a pivoting shaft to set a processing main spindle into swing motion so as to displace the processing main spindle in the X-axis direction, so that moving stroke is shortened to achieve reduction in size of the machine tool.

CITATION LIST

Patent Literature

Patent Literature 1: Japanese Patent Application Laid-open No. 63-52937

SUMMARY

However, in the space-saving automated machine tool described in Patent Literature 1, the mechanism for setting the processing main spindle into swing motion includes an arm-like spindle bracket interposed between the pivoting shaft and the processing main spindle. This configuration presents a disadvantageous configuration for securing rigidity during processing because thrust of the processing main spindle is transmitted to the pivoting shaft through the spindle bracket.

Further in the configuration, the balance of weight of the spindle bracket changes from moment to moment due to the self-weight of the spindle bracket as the arm-like spindle bracket rotates. The configuration is not structured such that the position of the spindle bracket is regulated, and thus position accuracy of the main spindle will be affected due to change in the balance of weight. Consequently, the configuration presents a disadvantageous configuration for securing positioning accuracy of the processing main spindle.

An object of the present disclosure, which has been made to solve the problems of the prior art as described above, is to provide a machine tool that achieves reduction in size, advantageously secures rigidity of the mechanism for moving the main spindle, and advantageously secures positioning accuracy of the main spindle.

In order to attain the above-described object, a machine tool of the present disclosure includes:
 a movable drum base;
 a drum that is incorporated in the drum base and is circular in outline; and
 a quill main spindle penetrating through the drum in a central axis direction of the drum, wherein protrusion allowance from the drum is adjustable, wherein
 a bearing provided along an outer circumference of the drum is interposed between the drum base and the drum such that the drum is rotatable in the drum base, and
 movement of the drum base, rotation of the drum, and protrusion allowance adjustment of the quill main spindle from the drum allow a tool mounted on the quill main spindle to be positioned.

According to the machine tool of the present disclosure, positioning of the tool in the radial direction of the tool can be achieved by rotation of the drum. This eliminates the need of mechanisms extending in the radial direction of the tool such as LM guide, so that space-saving can be achieved as a result of reduction in size. Since a quill main spindle is adopted, the machine tool of the present disclosure has good accessibility even to a workpiece with a projection or the like, and is excellent in vibration absorbability during workpiece processing, resulting in a good cut surface condition. In addition, in the quill main spindle, only a simple structure is sufficient for a sliding portion and the need of an intricate cover is eliminated. In this respect, good accessibility to a workpiece is also ensured, which means a shortened stress path during cutting, resulting in a good cutting ability.

In the present disclosure, the quill main spindle is supported by the drum, and the drum is provided with a bearing along the outer circumference of the drum. According to the configuration, when a workpiece is processed by the tool mounted on the quill main spindle, most of the force acting on the side of the drum due to a thrust of the quill main spindle may only be a thrust load acting on the bearing portion and the thrust load will be entirely received by the bearing portion provided on the entire perimeter of the drum. Accordingly, it is not necessary to particularly reinforce the drum itself, and rigidity is advantageously secured. Further, by receiving the thrust load entirely by the bearing portion, no particular reinforcement is required, and the depth dimension of the apparatus does not increase either, even when the diameter of the drum is increased.

Further, the drum that is circular in outline does not cause a change in arrangement even when the drum rotates, and thus does not cause a change in the balance of weight. In addition, since the entire perimeter of the drum is surrounded by the bearing, the position of the drum is always regulated even when the drum rotates. Accordingly, the position accuracy of the drum will not be degraded, and the position accuracy of the quill main spindle supported by the drum will not be degraded either even when the drum rotates.

In the machine tool of the present disclosure, preferably, the machine tool is used with a main body installed on a bed, and the main body is provided integrally with mechanisms for performing movement of the drum base, rotation of the drum, protrusion allowance adjustment of the quill main spindle from the drum, and rotation of the tool mounted on the quill main spindle. According to the configuration, it is possible to separate the main body from the bed and install the main body on another position on the bed or install the main body on another bed for use.

Further, in the machine tool of the present disclosure, preferably, the drum is rotated by rotating an outer circumference portion of the drum. According to the configuration, a moving distance of the quill main spindle disposed within the drum is smaller than a moving distance of the outer circumference portion of the drum. Accordingly, even when the position of the quill main spindle is far away from the outer circumference portion of the drum, the positioning accuracy of the quill main spindle will not be amplified.

The advantageous effects of the present disclosure have been described above. In summary, according to the present disclosure, space-saving can be achieved as a result of reduction in size, and since a quill main spindle is adopted, good accessibility to a workpiece and excellent vibration absorbability during workpiece processing are ensured, resulting in a good cut surface condition. Since the quill main spindle is supported by the drum and the drum is provided with a bearing along the outer circumference of the drum, rigidity is advantageously secured, and thus no particular reinforcement is required, and the depth dimension of the apparatus does not increase either, even when the diameter of the drum is increased. Further, the drum that is circular in outline does not cause a change in arrangement, and thus does not cause a change in the balance of weight. In addition, since the entire perimeter of the drum is surrounded by the bearing, the position of the drum is always regulated even when the drum rotates. Accordingly, the position accuracy of the drum will not be degraded, and the position accuracy of the quill main spindle supported by the drum will not be degraded either even when the drum rotates.

DETAILED DESCRIPTION OF THE EMBODIMENTS

The present disclosure relates to a machine tool, more specifically to a machining center that is capable of changing a plurality of tools (cutting tools) automatically and achieving many types of processing such as drilling or milling processing in one unit under NC (numerical control) programmed control. An embodiment of the present disclosure will now be described with reference to drawings.

Figure 1:
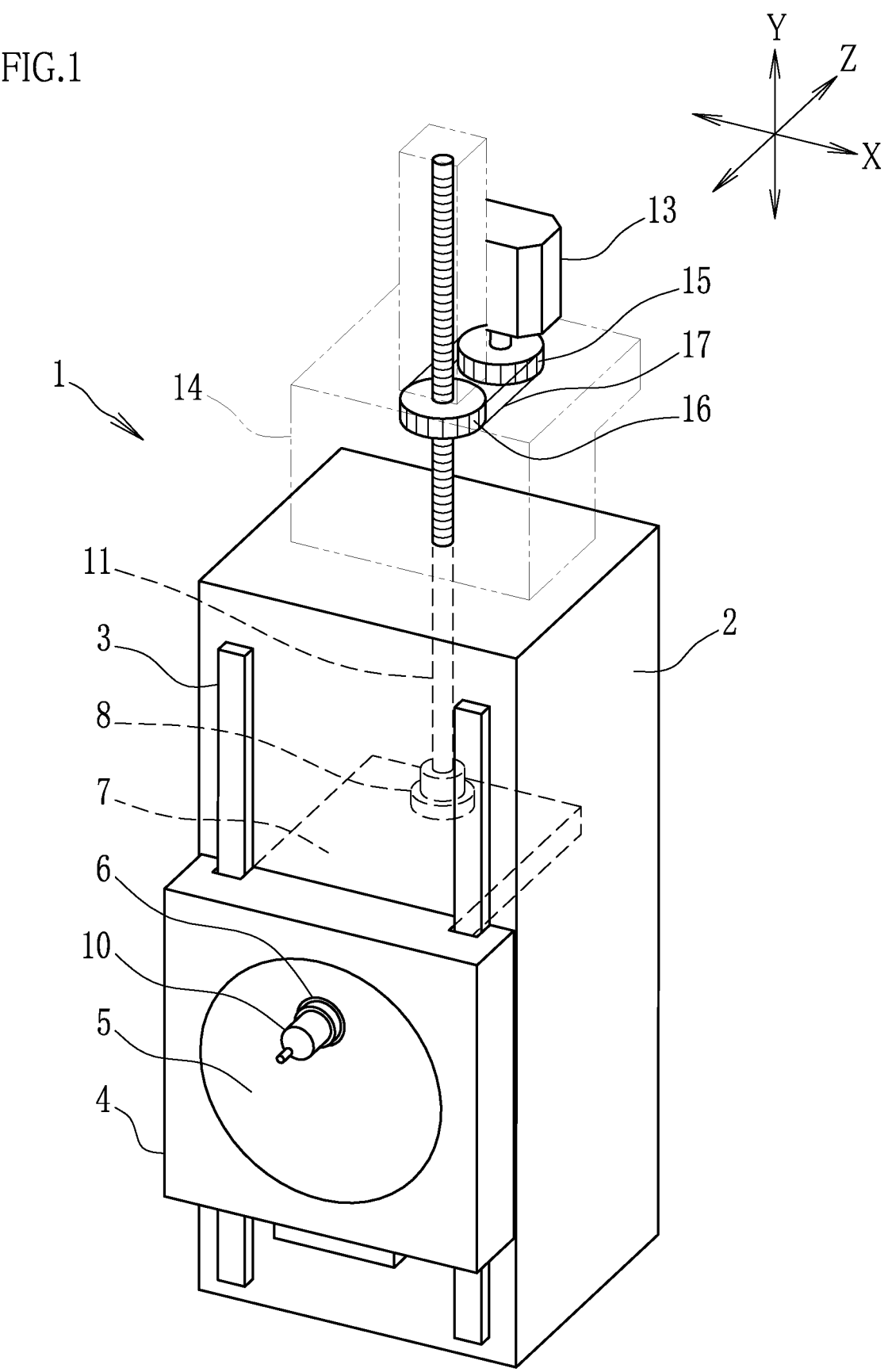
FIG. 1 is an exterior perspective view of a machine tool according to an embodiment of the present disclosure.
Figure 4:
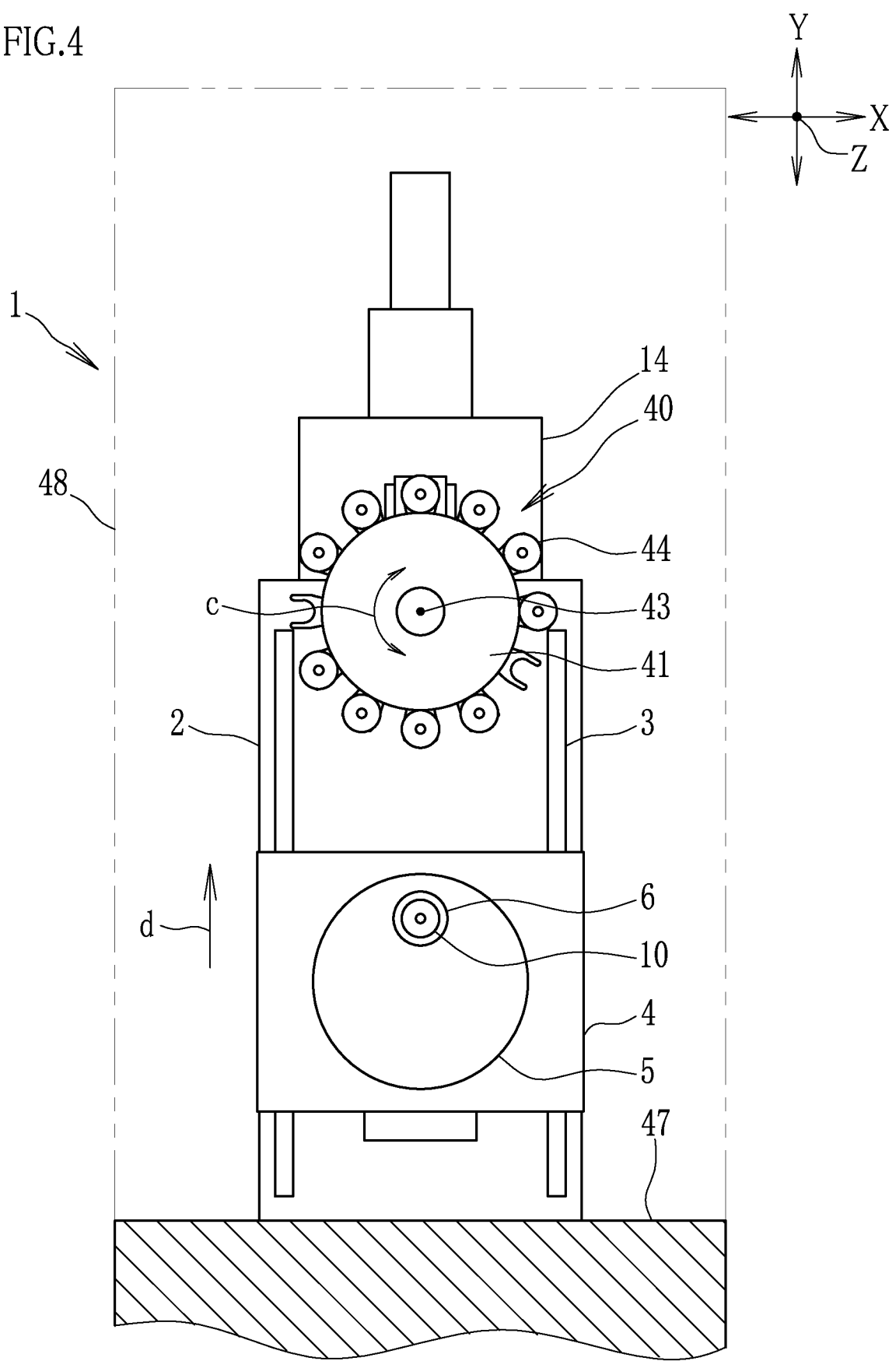
FIG. 4 is a front view of the machine tool according to an embodiment of the present disclosure.
Figure 5:
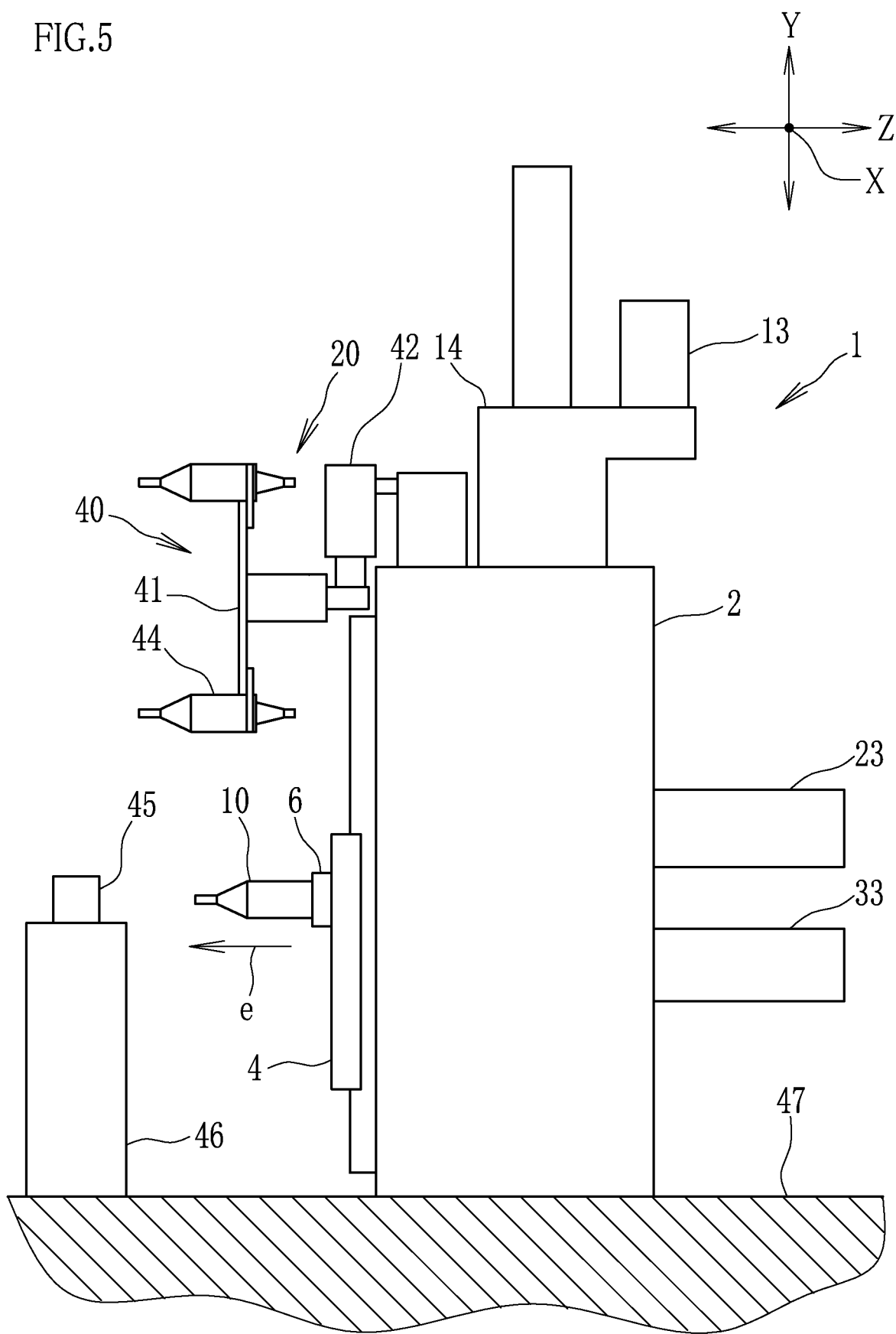
FIG. 5 is a side view of the machine tool according to an embodiment of the present disclosure.

FIG. 1 is an exterior perspective view of a machine tool 1 according to an embodiment of the present disclosure. In FIG. 1, the right-left direction (width direction) corresponds to an X-axis direction, the up-down direction corresponds to a Y-axis direction, and the front-back direction corresponds to a Z-axis direction. For convenience of illustration, in FIG. 1, an ATC (Automatic Tool Changer) 40 illustrated in FIG. 4 and FIG. 5 is not illustrated. A drum base 4 is engaged with a rail 3 attached to a main body 2. A drum 5 that is circular in outline is incorporated in the drum base 4. A quill main spindle 6 in which protrusion allowance from the drum 5 is adjustable penetrates through the drum 5 in a central axis direction of the drum 5.

The drum base 4 is integrated with extended portion 7 and a nut 8 is fixed to the extended portion 7. An up-down axis ball screw 11 is threaded engagement with the nut 8. When the up-down axis ball screw 11 rotates, the nut 8 moves upward or downward depending on the rotation direction, and the extended portion 7 and the drum base 4 move upward or downward accordingly. More specifically, the rotation of the up-down axis ball screw 11 causes the drum base 4 to move in the Y-axis direction, and the drum 5 attached to the drum base 4, the quill main spindle 6 attached to the drum 5, and the tool 10 attached to the quill main spindle 6 move in the Y-axis direction. In other words, the rotation of the up-down axis ball screw 11 makes it possible to position the tool 10 in the Y-axis direction.

The driving source for driving the up-down axis ball screw 11 to rotates is a Y-axis drive motor 13. A pair of pulleys 15, 16 are disposed in a case 14: the pulley 15 is attached to the Y-axis drive motor 13, and the pulley 16 is attached to the up-down axis ball screw 11. A timing belt 17 is meshed with the pulleys 15, 16. The rotation of a rotating shaft of the Y-axis drive motor 13 is transmitted to the pulley 15, the timing belt 17, and the pulley 16 to rotate the up-down axis ball screw 11.

Figure 2:
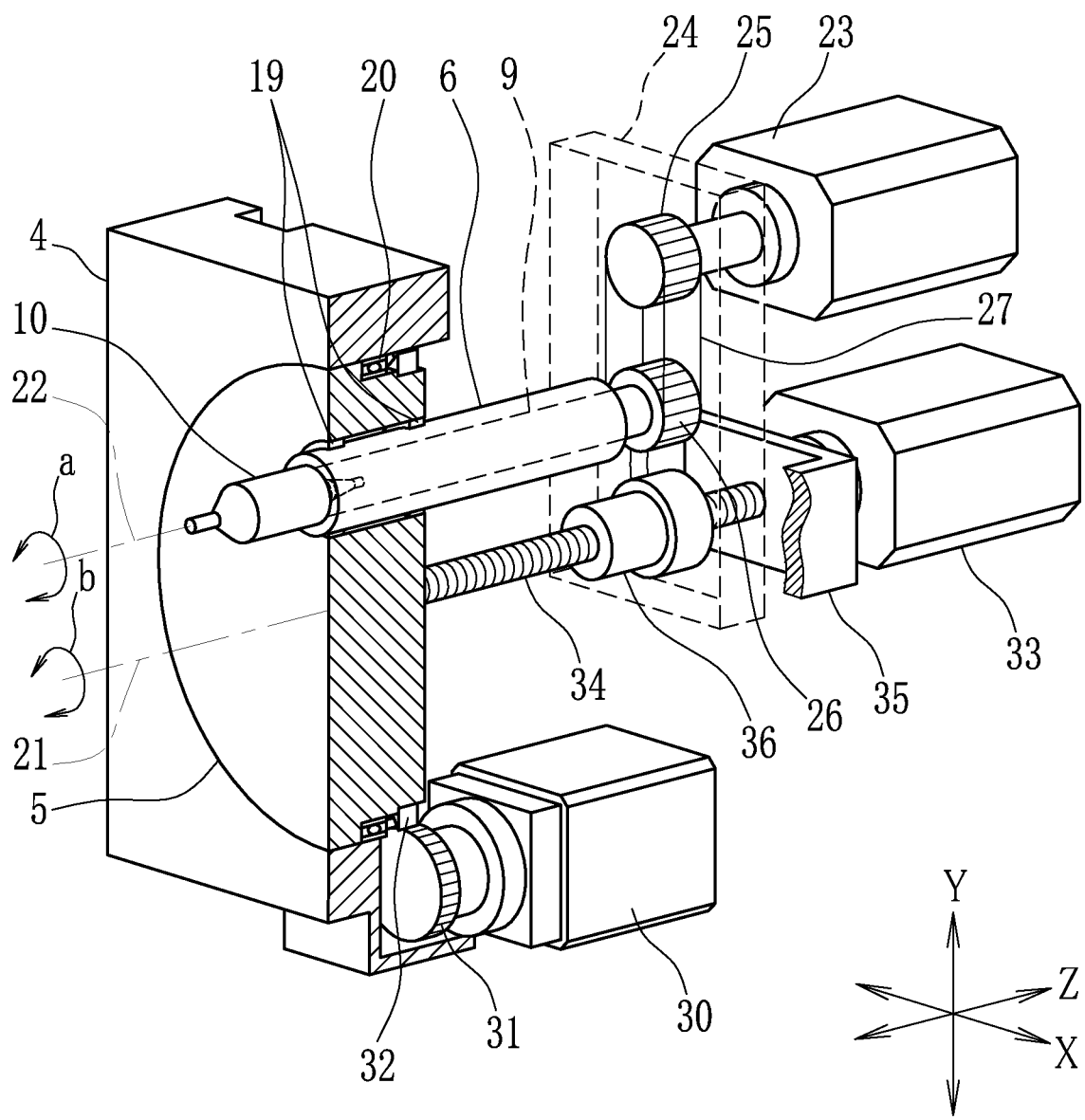
FIG. 2 is a perspective view illustrating an internal structure of the major portion of the main body illustrated in FIG. 1.

How the quill main spindle 6 and the drum 5 are driven will now be described with reference to FIG. 2. FIG. 2 is a perspective view illustrating the internal structure of the major portion of the main body 2 illustrated in FIG. 1. The drum 5 is rotatably attached in the drum base 4 via a bearing 20. The bearing 20 is a large-diameter rolling bearing. A center line 21 of the drum 5 and a center line 22 of the quill main spindle 6 are in parallel with each other, and the quill main spindle 6 passes through the drum 5 across the drum 5 in the direction of the center line 21 (Z-axis direction) of the drum 5. A slide bearing 19 is interposed between the quill main spindle 6 and a hole of the drum 5. The quill main spindle 6 is formed from a cylindrical body in which a rotating shaft 9 is incorporated, and a part of the tool 10 is to be inserted in a leading end portion of the rotating shaft 9.

In the quill main spindle 6, the cylindrical body forming an outer circumference portion does not rotate and the rotating shaft 9 contained therein rotates around the center line 22, so that the tool 10 rotates accordingly to process a workpiece. The driving source for driving the quill main spindle 6 to rotate is a main spindle drive motor 23. A pair of pulleys 25, 26 are disposed in a bracket 24: the pulley 25 is attached to the main spindle drive motor 23, and the pulley 26 is attached to a rear end portion of the rotating shaft 9. A timing belt 27 is meshed with the pulley 25, 26. The rotation of a rotating shaft of the main spindle drive motor 23 is transmitted to the pulley 25, the timing belt 27, and the pulley 26 to rotate the rotating shaft 9 of the quill main spindle 6 depending on the rotation direction of the rotating shaft of the main spindle drive motor 23, so that the tool 10 rotates accordingly (arrow "a" direction).

A gear 31 is attached to a drum drive motor 30, and the gear 31 is meshed with teeth 32 provided on the entire perimeter of the outer circumference portion of the drum 5. The teeth 32 may be teeth of a gear attached to the drum 5 or may be those directly formed on the drum 5. When a rotating shaft of the drum drive motor 30 rotates, the gear 31 rotates and the teeth 32 meshed with the gear 31 rotates, so that the drum 5 rotates accordingly (arrow "b" direction) depending on the rotation direction of the rotating shaft of the drum drive motor 30. When the drum 5 rotates, the quill main spindle 6 attached to the drum 5 rotates accordingly.

As described above, the protrusion allowance of the quill main spindle 6 from the drum 5 is adjustable. The driving source for protrusion allowance adjustment is a Z-axis drive motor 33. A front-back axis ball screw 34 is attached to the Z-axis drive motor 33. The front-back axis ball screw 34 passes through a motor support 35, thereby the Z-axis drive motor 33 is supported by the motor support 35.

For convenience of illustration, although the motor support 35 is broken in the illustration, the motor support 35 extends toward the drum 5 and distal ends thereof are fixed to the drum 5. A nut 36 is threaded engagement with the front-back axis ball screw 34. According to the configuration, when a rotating shaft of the Z-axis drive motor 33 rotates, the nut 36 moves in the Z-axis direction (front-back direction) depending on the rotation direction.

The nut 36 is fixed to the bracket 24. The quill main spindle 6 and the main spindle drive motor 23 are also fixed to the bracket 24. Accordingly, the movement of the nut 36 in the Z-axis direction (front-back direction) causes the quill main spindle 6 to move in the Z-axis direction accordingly, so that adjustment of the protrusion allowance of the quill main spindle 6 from the drum 5 is achieved.

As also described above, the motor support 35 supporting the Z-axis drive motor 33 is fixed to the drum 5, and the nut 36, the quill main spindle 6, and the main spindle drive motor 23 are fixed to the bracket 24. Accordingly, when the drum 5 rotates, not only the quill main spindle 6 but also the motor support 35, the bracket 24, and the main spindle drive motor 23 rotate accordingly.

Figure 3:
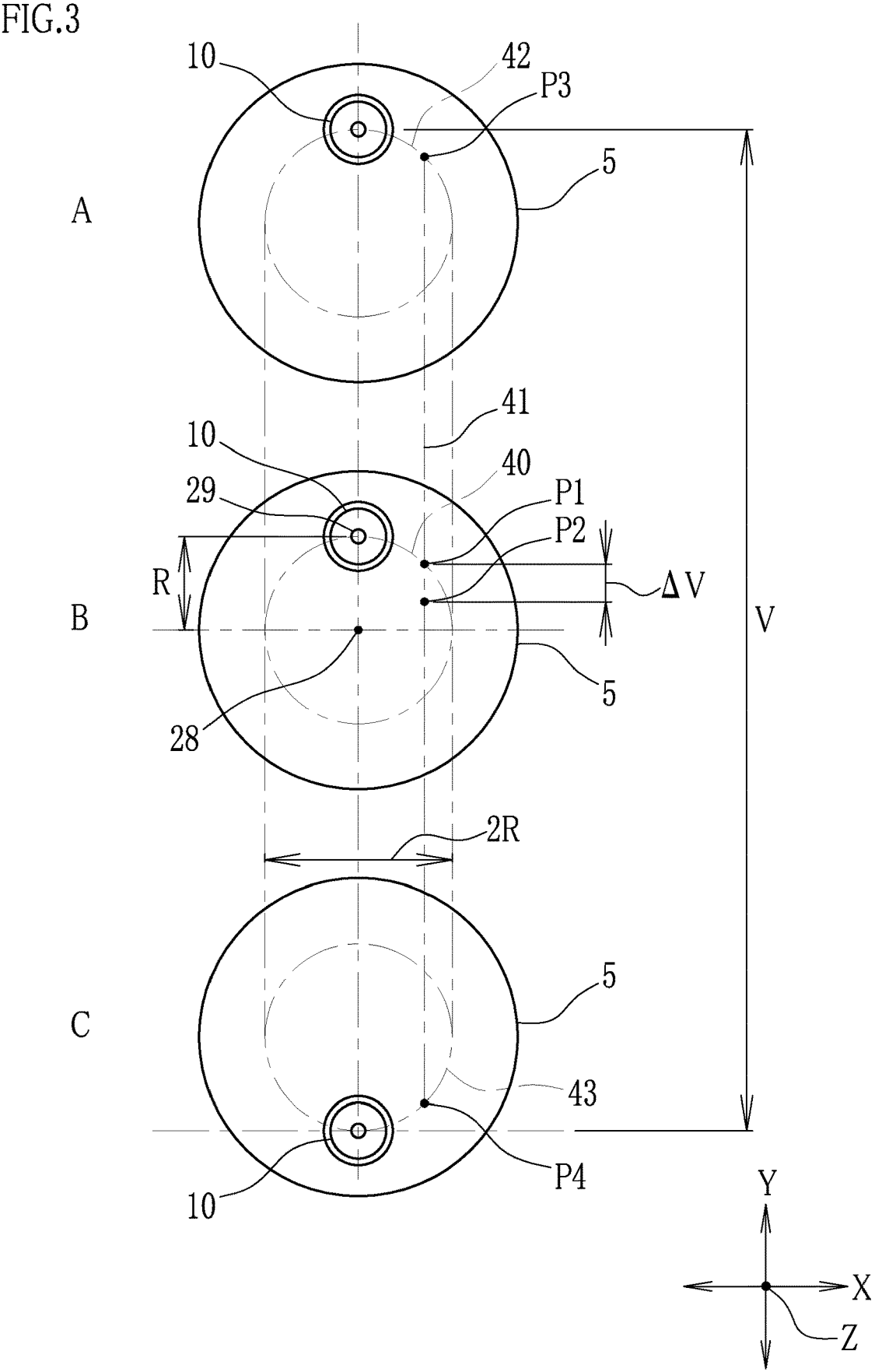
FIG. 3 presents views illustrating processing areas of a tool in an embodiment of the present disclosure.

Processing areas of the tool 10 will now be described with reference to FIG. 3. As described above, the drum base 4 moves in the up-down direction (Y-axis direction) and the drum 5 moves up and down accordingly. FIG. 3A illustrates the drum 5 in an upper stage position where the drum 5 is fully raised, FIG. 3C illustrates the drum 5 in a lower stage position where the drum 5 is fully lowered, and FIG. 3B illustrates the drum 5 in a middle stage position between the upper stage position and the lower stage position.

In FIG. 3B, with the turning radius of the tool 10 defined as R, a locus of a center point 29 of the tool 10 produces a circle 40 around a center point 28 of the drum 5. In this case, a movable range of the center point 29 of the tool 10 in the X-axis direction is equal to 2R, and thus in X-axis direction, the center point 29 of the tool 10 is movable to any positions in the 2R movable range. However, when the center point 28 of the drum 5 is fixed, the center point 29 of the tool 10 is kept movable only on the circle 40, and the center point 29 of the tool 10 does not move to, for example, the position at a point P2 below a point P1 on the circle 40.

On the other hand, lowering the drum 5 by ΔV from the position in FIG. 3B will cause the center point 29 of the tool 10 located at the position of the point P1 to reach the position of the point P2. Similarly, moving the drum 5 up and down as necessary allows the center point 29 of the tool 10 to move to any positions on a vertical line 41 connecting the point P3 and the point P4. A point P3 is a point on the circle 42 that is the locus of the center point 29 of the tool 10 when the drum 5 is at the upper stage position, and a point P4 is a point on the circle 43 that is the locus of the center point 29 of the tool 10 when the drum 5 is at the lower stage position.

As for the fact that the center point 29 of the tool 10 can be moved to any positions on the vertical line 41, the same applies to any vertical line connecting a point on an upper half arc of the circle 42 and a point on a lower half arc on the circle 43. Accordingly, within the 2R movable range in the X-axis direction, the center point 29 of the tool 10 has its movable area in areas between the upper half arc of the circle 42 and the lower half arc of the circle 43.

Accordingly, combining a moving distance of the rotation of the drum 5 and an up-down moving distance of the drum 5 as necessary allows the tool 10 to be positioned at any positions in the movable area. More specifically, an in-plane target position of the tool 10 is determined by the position in the X-axis direction and the position in the Y-axis direction. Accordingly, rotating the drum 5 to position the tool 10 at a target position in the X-axis direction and then moving the drum 5 in the up-down direction to position the tool 10 at a target position in the Y-axis direction makes it possible to position the tool 10 at any target position. After the tool 10 is positioned at the target position, the quill main spindle 6 is extended from the drum 5 (Z-axis direction) to process a workpiece by the tool 10.

In the embodiment, positioning of the tool 10 in the X-axis direction can be achieved by rotation of the drum 5. This eliminates the need of mechanisms extending in the X-axis direction such as LM guide, so that space-saving can be achieved as a result of reduction in size.

Further, in the embodiment, it is possible to produce advantageous effects as described below because of adoption of the quill main spindle 6. When the tool 10 is caused to approach a workpiece, the large area drum base 4 does not move, and the quill main spindle 6 that is cylindrical in outline is extended in the Z-axis direction to cause the tool 10 to approach the workpiece. According to the configuration, good accessibility is ensured even to a workpiece with a projection or the like.

As illustrated in FIG. 2, the quill main spindle 6 is attached to the drum 5 via the slide bearing 19. In this configuration, a static frictional force is generated in the slide bearing 19 during milling processing when the quill main spindle 6 is not moved in the Z-axis direction, and a kinetic frictional force is generated in the slide bearing 19 during drilling processing when the quill main spindle 6 is moved in the Z-axis direction. Accordingly, the quill main spindle 6 is excellent in vibration absorbability during workpiece processing, resulting in a good cut surface condition. On the other hand, a unit-moving type that uses LM guides is susceptible to chattering because only a rolling frictional force is generated.

Further, the unit-moving type requires an intricate cover for preventing cutting dust from entering the LM guide that is the sliding portion, which keeps a spindle away from an object to be processed. In contrast, a slide of the quill main spindle 6 is configured such that the quill main spindle 6 slides in the slide bearing 19 as illustrated in FIG. 2. Accordingly, only a simple structure is sufficient for the sliding portion, the need of an intricate cover is eliminated, and good accessibility of the quill main spindle 6 to a workpiece is ensured. This means a shortened stress path during cutting, resulting in a good cutting ability.

Next, in the embodiment, as illustrated in FIG. 2, the support structure for the quill main spindle 6 is configured such that the quill main spindle 6 is supported by the drum 5 rotatably attached in the drum base 4 via the bearing 20 (hereinafter referred to as "drum type"). In the drum type, when a workpiece is processed by the tool 10 mounted on the quill main spindle 6, most of the force acting on the side of the drum 5 due to a thrust of the quill main spindle 6 may only be a thrust load acting on the bearing 20 portion. Since the thrust load will be entirely received by the bearing 20 portion provided on the entire perimeter of the drum 5, it is not necessary to particularly reinforce the drum 5 itself, which makes the drum type an advantageous structure to secure rigidity. On the other hand, in a structure in which a pivoting shaft is attached to one end of an arm and a main spindle is supported on the other end of the arm (hereinafter referred to as "arm type"), the thrust of the main spindle acts in the direction in which the arm is directly deformed and is transmitted to the pivoting shaft during workpiece processing, which makes the structure disadvantageous to secure rigidity.

This becomes more noticeable as the turning radius of the tool increases. For example, in the arm type, when the turning radius is increased twofold, the moment acting on the bearing supporting the pivoting shaft increases twofold due to a reaction force experienced by the tool during workpiece processing, and thus the force acting on the bearing increases. In this case, it is necessary to take measures such as thickening the pivoting shaft to increase rigidity or increasing the length of the pivoting shaft to reduce the force acting on the bearing. Increasing the length of the pivoting shaft also leads to an increase in the depth dimension of the apparatus accordingly. In contrast, as described above, in the drum type, the thrust load during workpiece processing is entirely received by the bearing 20 portion provided on the entire perimeter of the drum 5, and thus no particular reinforcement is required, and the depth dimension of the apparatus does not increase either, even when the diameter of the drum is increased.

Still in the arm type, degradation of positioning accuracy of the main spindle is amplified relative to the length of the arm. In contrast, in the drum type illustrated in FIG. 2, when the outer circumference portion of the drum 5 is driven to rotate, a moving distance of the quill main spindle 6 disposed within the drum 5 is smaller than a moving distance of the outer circumference portion of the drum 5. Accordingly, even when the position of the quill main spindle 6 is far away from the outer circumference portion of the drum 5, the positioning accuracy of the quill main spindle 6 will not be amplified. In other words, the drum type in which the outer circumference portion of the drum 5 is rotated as illustrated in FIG. 2 is advantageous in the positioning accuracy of the quill main spindle 6.

Still further, in the arm type, arm arrangement changes as the arm rotates, and the balance of weight of the arm changes from moment to moment due to the self-weight of the arm. At this time, since the arm type, one end of which is a free end, is not structured such that the free end is supported, and thus position accuracy of the main spindle will be affected due to change in the balance of weight.

In contrast, the drum 5 that is circular in outline does not cause a change in arrangement, and thus does not cause a change in the balance of weight even when the drum 5 rotates. Further, as illustrated in FIG. 2, the drum 5 is supported in the drum base 4 via the bearing 20. With this bearing structure, the position of the drum 5 is regulated. Since the entire perimeter of the drum 5 is surrounded by the bearing 20, the position of the drum 5 is always regulated even when the drum 5 rotates. Accordingly, the position accuracy of the drum 5 will not be degraded, and the position accuracy of the quill main spindle 6 supported by the drum 5 will not be degraded either even when the drum 5 rotates. Processing accuracy of a workpiece in which slight degradation of the position accuracy would otherwise be problem is advantageously secured.

The machine tool 1 will now be described more specifically with reference to FIG. 4 and FIG. 5. FIG. 4 is a front view of the machine tool 1 and FIG. 5 is a side view of the machine tool 1. In FIG. 4 and FIG. 5, the ATC (Automatic Tool Changer) 40, which is not illustrated in FIG. 1, is illustrated. In FIG. 4, the ATC 40 is provided with a rotating disk 41, and a plurality of tools 44 are removably attached to the rotating disk 41. The rotating disk 41 is driven to rotate by an ATC rotation motor 42 illustrated in FIG. 5 and rotates around a center 43 of the rotating disk 41 illustrated in FIG. 4 (arrow "c"). When the tool is to be changed, the drum base 4 is raised in the Y-axis direction (arrow "d"), and the tool 10 mounted on the leading end of the quill main spindle 6 is replaced with a tool 44 attached to the rotating disk 41 of the ATC 40.

In FIG. 4, the main body 2 is installed on a bed 47. The main body 2 is housed in an outer case 48. For convenience of illustration, in FIGS. 5 to 9, the outer case 48 is not illustrated. As illustrated in FIG. 5, the Y-axis drive motor 13 is integrated with the main body 2 via the case 14, and the main spindle drive motor 23 and the Z-axis drive motor 33 are integrated with the main body 2. As illustrated in FIG. 1 and FIG. 2 (internal structure of the main body 2), mechanisms driven by the Y-axis drive motor 13, the main spindle drive motor 23 and the Z-axis drive motor 33 are incorporated in the case 14 or the main body 2. As illustrated in FIG. 2, mechanisms driven by the drum drive motor 30 and the drum drive motor 30 are also incorporated in the main body 2.

In other words, a mechanism for moving the drum base 4 using the Y-axis drive motor 13 as the driving source, a mechanism for rotating the tool 10 mounted on the quill main spindle using the main spindle drive motor 23 as the driving source, a mechanism for adjusting the protrusion allowance of the quill main spindle 6 from the drum 5 using the Z-axis drive motor 33 as the driving source, and a mechanism for rotating the drum 5 using the drum drive motor 30 as the driving source are integrated with the main body 2. According to the configuration, it is possible to separate the main body 2 from the bed 47 and install the main body on another position on the bed 47 or install the main body on another bed 47 for use. For example, by installing three main bodies 2 on the bed 47, it is possible to process a T-shaped workpiece from 3 directions simultaneously. At this time, while processing of such a workpiece is suspended, only the main body 2 for 1 unit may be installed on another bed 47, for example, to process another workpiece without moving the entire machine tool 1.

The operation of the machine tool 1 will now be described with reference to FIGS. 5 to 9 in order of steps. In FIG. 5, the workpiece 45 is supported on the workpiece support table 46. The workpiece support table 46 and the workpiece 45 are schematically illustrated and the support structure for the workpiece 45 is not illustrated. In the state in FIG. 5, the position in the X-axis direction and the position in the Y-axis direction of the tool 10 are positioned by rotational movement and up and down movement of the drum 5 (see FIG. 4) to the position facing a processed site in the workpiece 45.

From the state in FIG. 5, the Z-axis drive motor 33 is driven to move forward the quill main spindle 6 in the Z-axis direction (arrow "e" direction) so that the tool 10 mounted on the leading end of the quill main spindle 6 reaches the target processed site in the workpiece 45. In this state, the tool 10 integrated with the rotating shaft 9 of the quill main spindle 6 (see FIG. 2) is rotated by being driven by the main spindle drive motor 23, and processing of the workpiece 45 by the tool 10 is enabled.

Figure 6:
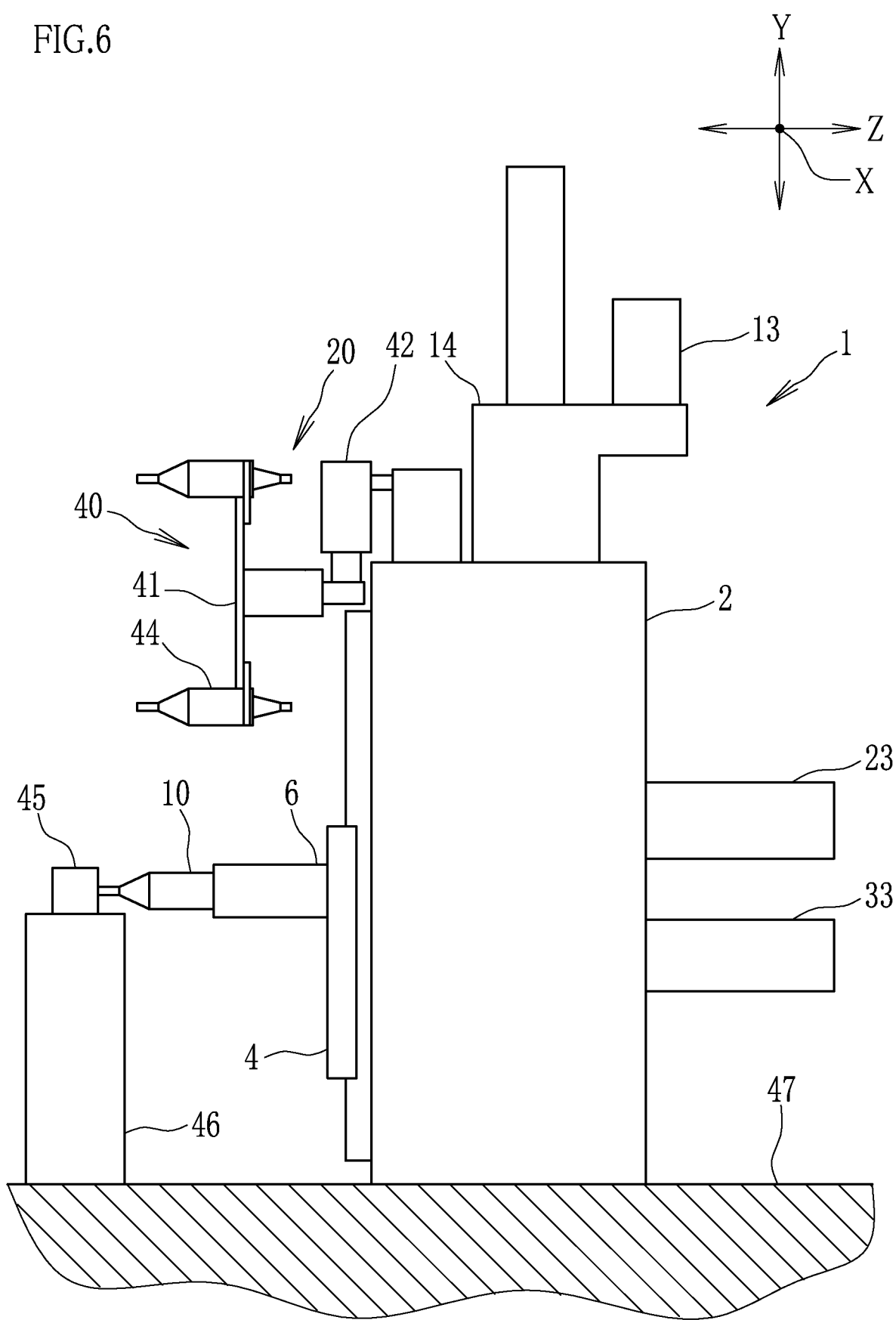
FIG. 6 is a side view illustrating when a workpiece is being processed by a tool in an embodiment of the present disclosure.

FIG. 6 illustrates when the workpiece 45 is being processed by the tool 10. During processing, the tool 10 is rotating around the center line 22 (see FIG. 2) of the quill main spindle 6. By using a drill as the tool 10, drilling processing can be performed, and by using a tap, tapping processing can be performed. Further, by using an end mill as the tool 10, milling process can be performed. In this case, the drum drive motor 30 (see FIG. 2), the Y-axis drive motor 13, and the Z-axis drive motor 33 are driven to position the tool 10 in XYZ directions as necessary to continue processing.

Figure 7:
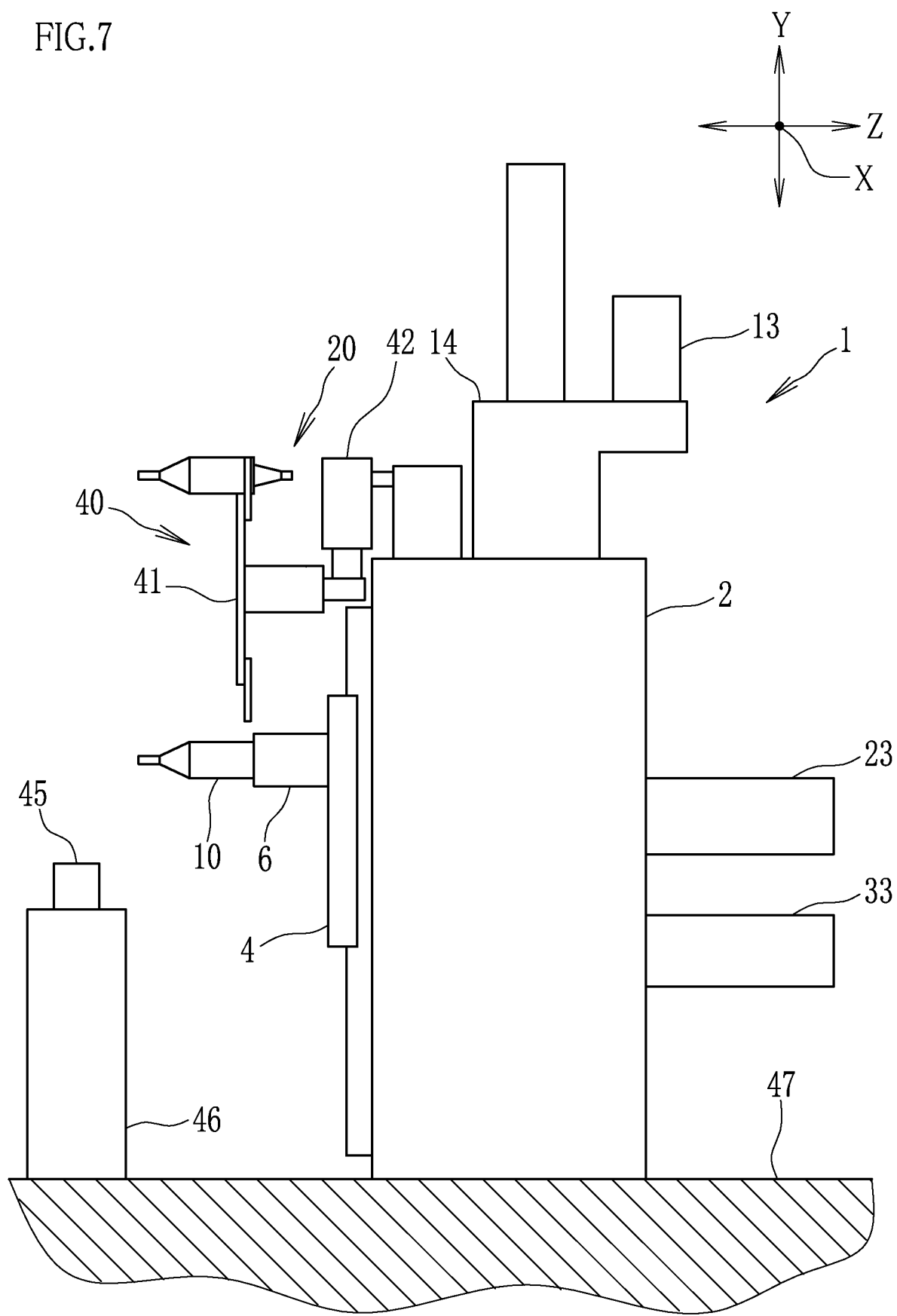
FIG. 7 is a side view of the tool withdrawn and further moved up from the state in FIG. 6.
Figure 8:
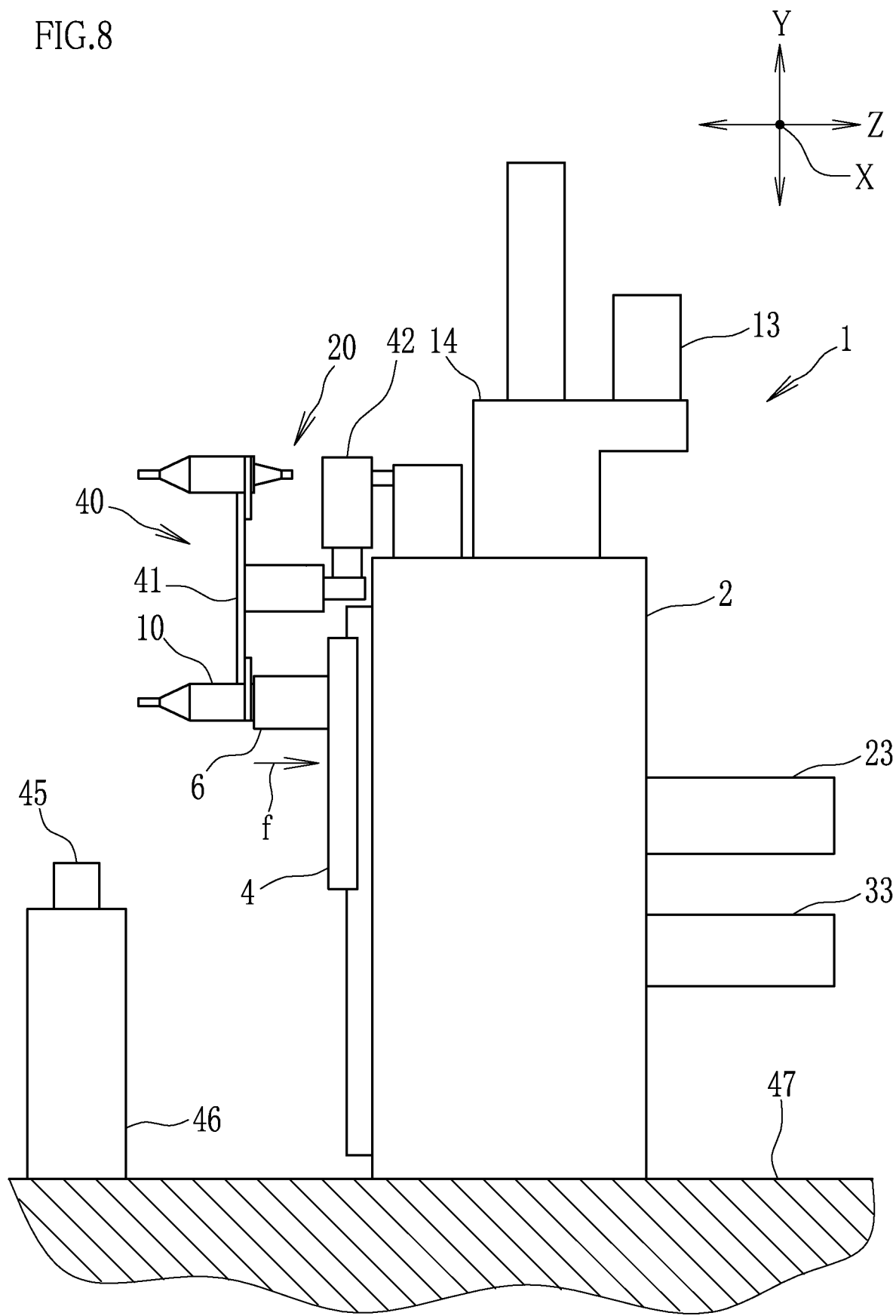
FIG. 8 is a side view illustrating when the tool is mounted on a rotating disk of an ATC from the state in FIG. 7.

When processing by the tool 10 is completed and the tool 10 is to be changed for another processing, the ATC 40 is used to change the tool. FIG. 7 illustrates a state immediately before changing the tool. FIG. 7 illustrates when the tool 10 is withdrawn and further moved up from the state in FIG. 6. FIG. 8 illustrates when the tool 10 is passed to the rotating disk 41 of the ATC 40. During this time, the ATC 40 does not move, and the drum base 4 is raised from the state in FIG. 7 so that the tool 10 can be mounted on the rotating disk 41 of the ATC 40.

Figure 9:
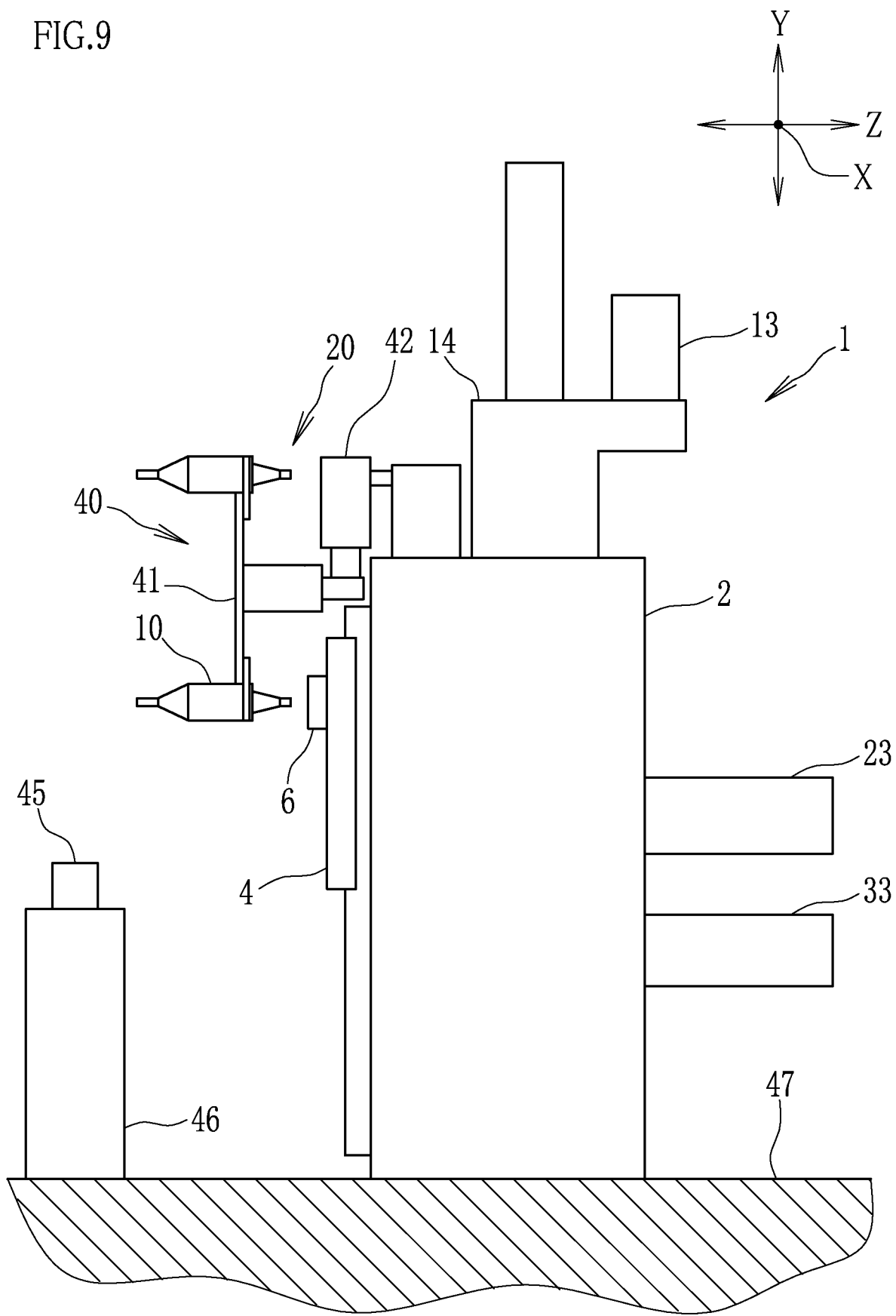
FIG. 9 is a side view illustrating when the tool is removed from the quill main spindle subsequently from the state in FIG. 8.

FIG. 8 illustrates when the tool 10 is mounted on the rotating disk 41 of the ATC 40. When the quill main spindle 6 is withdrawn from this state (arrow "f"), the tool 10 is removed from the quill main spindle 6. FIG. 9 illustrates when the tool 10 is removed from the quill main spindle 6. The rotating disk 41 is rotated from the state in FIG. 9 (see arrow "c" in FIG. 4) so that the tool 44 required for the next processing can be caused to face the quill main spindle 6. In the reverse way from the previous description, thereafter, the other tool 44 can be mounted on the quill main spindle 6, the tool 44 can be caused to face the workpiece 45, and the workpiece 45 can be processed.

Figure 10:
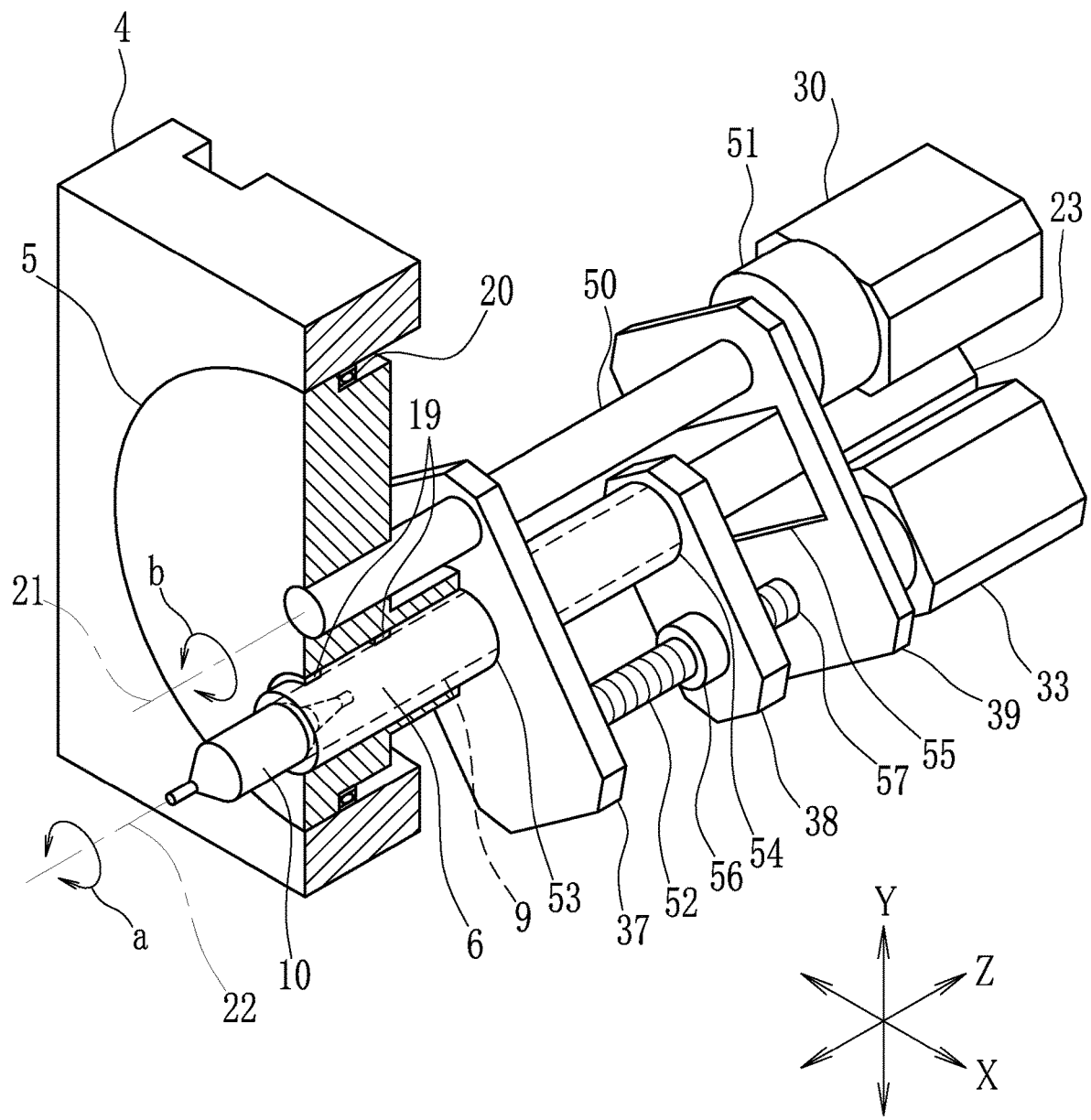
FIG. 10 is a perspective view illustrating another example of a drive structure for the drum and the quill main spindle in an embodiment of the present disclosure.

An embodiment of the present disclosure has been described above. However, the embodiment is merely an example and may be subjected to modification as necessary. FIG. 10 is a perspective view illustrating another example of the drive structure of the drum 5. FIG. 10 illustrates the internal structure of the major portion of the machine tool 1 as in FIG. 2, and thus the same or similar configurations as or to those in FIG. 2 will be given the same reference numerals and the description will not be repeated.

In FIG. 10, the quill main spindle 6 passes through a hole 53, a hole 54, and a cutout 55 in a bracket 37, a moving bracket 38, and a bracket 39, respectively, and the moving bracket 38 is fixed to the quill main spindle 6. Although not illustrated, a rotating mechanism formed from a pulley and a timing belt is interposed between the main spindle drive motor 23 and the rotating shaft 9 of the quill main spindle 6. The rotating shaft 9 is driven to rotate by the main spindle drive motor 23 and the tool 10 rotates accordingly (arrow "a" direction).

A drum rotating shaft 50 is attached to the drum drive motor 30 via a speed reducer 51. The drum rotating shaft 50 is fixed to the drum 5. When the rotating shaft of the drum drive motor 30 rotates, the drum rotating shaft 50 rotates via the speed reducer 51, and the drum 5 rotates accordingly (arrow "b" direction) depending on the rotation direction of the rotating shaft of the drum drive motor 30. In place of the speed reducer 51, a rotating mechanism formed from a pulley and a timing belt may be used.

A front-back axis ball screw 52 is attached to the Z-axis drive motor 33. The front-back axis ball screw 52 passes through the hole 57 of the bracket 39, and thereby the Z-axis drive motor 33 is supported by the bracket 39. Further, a nut 56 integrated with the bracket 38 is in threaded engagement with the front-back axis ball screw 52. According to the configuration, when the rotating shaft of the Z-axis drive motor 33 rotates, the moving bracket 38 integrated with the nut 56 moves in the Z-axis direction (front-back direction) depending on the rotation direction.

The quill main spindle 6 is fixed to the moving bracket 38. On the other hand, the quill main spindle 6 is independent of the bracket 37 at the hole 53 portion of the bracket 37 so as to be movable. Accordingly, the quill main spindle 6 and the main spindle drive motor 23 move in the Z-axis direction according to the movement of the moving bracket 38 in the Z-axis direction (front-back direction) so that the protrusion allowance of the quill main spindle 6 from the drum 5 is adjusted. When the protrusion allowance of the quill main spindle 6 extends, the main spindle drive motor 23 passes through the cutout 55 in the bracket 39, so that the main spindle drive motor 23 and the bracket 39 are not interfered with each other.

The moving bracket 38 is fixed to the quill main spindle 6, the main spindle drive motor 23 is integrated with the quill main spindle 6, and the bracket 37 and the bracket 39 are fixed to the drum rotating shaft 50. Accordingly, when the drum rotating shaft 50 rotates, not only the drum 5, the quill main spindle 6, the main spindle drive motor 23, and the moving bracket 38, but also the bracket 37, the bracket 39, and the Z-axis drive motor 33 rotate.

As described above, FIG. 10 is another example of the drive structure for the drum 5, and in the drive structure of the drum 5 in FIG. 10, it is possible to eliminate the drive mechanism formed from the gear 31 and the gear 32 as in FIG. 2.

Although another example of the drive structure for the drum 4 and the quill main spindle 6 has been described above, other configurations may be subjected to modification as necessary. For example, in FIG. 5, the ATC rotation motor 42 is disposed such that the rotating shaft is in a vertical orientation. However, it may be disposed such that the rotating shaft is in a horizontal orientation and the rotation motor 42 may be directly attached to the rotating disk 41.

Further, although the machine tool 1 of the embodiment has been described taking a horizontal type as an example, in which the quill main spindle 6 is disposed horizontally, a vertical type may be employed, in which the quill main spindle 6 is disposed vertically. In the horizontal type, the drum base 4 moves in the up-down direction (vertical direction) as described above, while the drum base 4 moves in the right-left direction (horizontal direction) in a vertical type.

REFERENCE SIGNS LIST 1 machine tool
4 drum base
5 drum
6 quill main spindle
10, 44 tool
13 Y-axis drive motor
20 bearing 23 main spindle drive motor
30 drum drive motor
33 Z-axis drive motor
40 ATC (Automatic Tool Changer)
45 workpiece
47 bed

What is claimed is:

1. A machine tool, comprising:
a movable drum base that is engaged with a rail and moves upward or downward along the rail;
a drum that is incorporated in the drum base and is circular in outline; and
a quill main spindle penetrating through the drum in a direction that is parallel to a central axis direction of the drum, wherein a protrusion allowance of the quill main spindle from the drum is adjustable, and wherein:
  a bearing provided along an outer circumference of the drum is interposed between the drum base and the drum such that the drum is rotatable in the drum base,
  movement of the drum base, rotation of the drum, and adjustment of the protrusion allowance of the quill main spindle from the drum allow a tool mounted on the quill main spindle to be positioned,
  the machine tool is used with a main body installed on a bed,
  the main body is provided integrally with an automatic tool changer and mechanisms for performing movement of the drum base, rotation of the drum, adjustment of the protrusion allowance of the quill main spindle from the drum, and rotation of the tool mounted on the quill main spindle, and
  when the quill main spindle is withdrawn away from the automatic tool changer after the drum base has been moved upwardly to mount the tool on the automatic tool changer, the tool is removed from the quill main spindle.

2. The machine tool according to claim 1, wherein the drum is rotated by rotating an outer circumference portion of the drum.

* * * * *